United States Patent

[11] 3,570,338

| [72] | Inventor | Paul Stolzer<br>Achern, Baden, Germany |
| --- | --- | --- |
| [21] | Appl. No. | 802,873 |
| [22] | Filed | Feb. 27, 1969 |
| [45] | Patented | Mar. 16, 1971 |
| [73] | Assignee | Firma Karl Stolzer<br>Achern, Baden, Germany |
| [32] | Priority | Mar. 5, 1968 |
| [33] | | Germany |
| [31] | | P 16 52 788.1 |

[54] METHOD AND APPARATUS FOR MEASURING BLADE TENSION OF POWER HACKSAW
14 Claims, 4 Drawing Figs.

[52] U.S. Cl. ................................................. 83/13,
83/62, 83/74, 83/522, 83/647
[51] Int. Cl. ...................................................... B23d 49/04
[50] Field of Search .......................................... 83/62, 13,
74, 522, 647; 73/143

[56] References Cited
UNITED STATES PATENTS

| 1,201,244 | 10/1916 | Blum | 83/62X |
| 1,323,818 | 12/1919 | Berry | 73/143X |
| 1,972,328 | 9/1934 | Blum | 83/62 |

Primary Examiner—James M. Meister
Attorney—McGlew and Toren

ABSTRACT: In a method and apparatus for measuring the tension of a saw blade positioned in the saw bow of a power hacksaw, particularly during operation of the hacksaw, the angle through which the front arm of the saw bow is bent by the blade tension, relative to the remainder of the bow, is measured and the measurement is transmitted to a control element for interrupting movement of the saw bow as soon as the blade tension either exceeds or drops below a normal operating tension. The measurement may be effected electrically by means of a strain bridge on the saw bow or mechanically by a bow-shaped feeler arm whose front end is rigidly secured to the front arm of the saw bow, with the remainder of the feeler arm being pivoted freely when the front arm of the saw bow is bent. The rear end of the feeler arm acts upon the control element.

INVENTOR.
PAUL STOLZER

Patented March 16, 1971

INVENTOR.
PAUL STOLZER
BY

INVENTOR.
PAUL STOLZER
BY
McGlew & Toren
ATTORNEYS

METHOD AND APPARATUS FOR MEASURING BLADE TENSION OF POWER HACKSAW

BACKGROUND OF THE INVENTION

It is a well-known fact that the proper operation of a power hacksaw requires the saw blade to have a certain tension. If this tension is too low, the saw blade will be bent out of its normal operating position by the pressure exerted upon it. The cuts made by the blade then will be inaccurate, and the blade will be excessively heated and worn out prematurely. If, on the other hand, the tension of the saw blade is too high, there is the danger that the blade might break as the result of the cutting pressure which is exerted thereon. If such a breakage of the saw blade occurs and the driving power of the saw is not interrupted immediately, serious additional damage may occur, for example, a breakage of the saw bow, damage to the driving means of the saw bow, or destruction of the workpiece which is to be cut.

In already known power hacksaws, the tension of the saw blade usually is adjusted by means of a pin or rod-shaped tightening element to which one end of the saw blade is connected, and which is guided in the end of one arm of the saw bow and adjustable in its axial direction by means of a screw or nut. Such tightening means have the disadvantage that, due to soiling, the tightening element easily may jam in its guide means, and that force may then be applied improperly to knock this element loose, which may have the result that the tightening element and/or its guide means will be deformed and the tightening element thereafter will be hardly movable at all in its guide means. Even if the tightening element is still movable with difficulty, it then is no longer possible to tighten the saw blade properly, because, when the screw or nut on the end of the tightening element is tightened, the tightening element, by being movable only with difficulty, then will give the operator of the machine the impression that the saw blade has a tension which it does not actually possess.

These disadvantages are especially serious also in connection with tightening means which are equipped with a device which is adapted to indicate the breakage of a saw blade and to actuate a limit switch which stops the driving means of the saw bow when the tension of the saw blade suddenly drops due to such breakage. If, in such a case, the tightening element is jammed in its guide means, the saw blade will still appear to be properly tightened even though it is actually broken. The driving means of the saw bow therefore will not be stopped automatically, and the mentioned ruinous results of such a breakage of the saw blade which is not immediately detected cannot be avoided.

A further disadvantage of the known devices for indicating the breakage of a saw blade is due to the fact that the electric cable for connecting the limit switch must extend from a stationary part to a continuously moving part. This cable therefore is subjected to considerable mechanical stresses since it has to follow continuously the reciprocating movements of the saw bow and also may be easily damaged or torn off, since it has to be freely suspended in passing from above to the saw bow. Although attempts have been made to overcome this advantage by employing sliding contacts on the guide means of the saw bow for producing the electric connecting to the limit switch, these attempts also did not lead to satisfactory results because of the constant danger that the electric connection between the slide contacts and the contact bars might become soiled and might thus be interrupted.

SUMMARY OF THE INVENTION

This invention is directed to the determination of the tension of the saw blade of a power hacksaw and, more particularly, to a novel and improved method and apparatus for determining such tension and which are free of disadvantages of the prior art.

In accordance with the invention, when the tension of the saw blade is adjusted, the resulting tension of the saw bow is measured even while the latter is reciprocating. The measured value is transmitted to at least one control element which is stationary relative to the movable saw bow, and which is constructed and arranged to interrupt the operation of the driving means of the saw bow, as by disconnecting this driving means from its source of power, when the tension of the saw blade deviates from its intended value.

According to one embodiment of the invention, this may be accomplished by carrying out an electric resistance measurement by means of a strain bridge which is connected to the saw bow near the center thereof. When the resistance value measured then either exceeds or drops below the normal resistance value which corresponds to the proper tension of the saw blade, a transmitter, which is movable with the saw bow provides an electric impulse which will actuate the control element.

In accordance with another embodiment of the invention, which is preferred because of its simplicity, the tension of the saw blade is measured by a mechanical measuring device which constantly indicates the angular position of the front arm of the saw bow relative to the guide means of the saw bow, by means of a mechanical feeler arm which actuates the control element when the tension of the saw blade either exceeds or drops below the desired value.

Instead of measuring the tension of the saw blade directly on the tightening element for the blade, as was done prior to this invention, the present invention provides that the deformation of the saw bow, which is caused by the tension of the saw blade, is employed as a measuring value for determining the actual blade tension. This measuring value is not affected by any influences and especially not by those which are caused by jamming of the tightening element in its guide means, which latter have caused inaccurate or false indications of known indicating devices.

The device according to the invention may comprise, for example, a feeler arm which may have a general shape similar to that of a saw bow, and which has a front end which is rigidly secured to or integral with the saw bow at a point near the tightening element for the saw blade. The rear end of this feeler arm carries a control arm which extends in the direction of movement of the saw bow and, when the saw blade has the proper tension, parallel to the guide means of the saw bow. The part of the machine which contains these guide means may also form the support of at least one control element which may be actuated by the control arm when the tension of the saw blade either exceeds or drops below the preset value.

In order to protect the feeler arm from any damage, it is another feature of the invention to make the saw bow of a recessed cross-sectional shape, for example, of an I-shape or U-shape, and to mount the feeler arm within the confines of this saw bow so as to extend along the same and be freely movable relative thereto with the exception of its front end which is rigidly secured to the saw bow. Thus, when the saw blade is tightened or released in the saw bow and the saw bow thereby is bent, this deformation of the saw bow will be transmitted by the latter to the front end of the feeler arm to which it is secured. The main length of the feeler arm then will be pivoted freely and independently of the saw bow in accordance with this deformation.

The same also applies if the saw bow is made of a hollow or tubular cross section. In this event, the feeler arm may be made integral with the hollow saw bow by compound casting so that the end of its front arm is integral with the corresponding part of the saw bow, while its main length extends freely along the saw bow inside the latter. The rear end part of the feeler arm, which forms the control bar, then projects outwardly through an aperture in one wall of a rear part of the saw bow and extends to a control element. Since the feeler arm, including the control bar, may have a considerable length, it is advisable to guide its free part at least at one point of its length, but in such a manner that the guide means will be interfere with the pivoting movements of the feeler arm.

The control bar, which forms an extension of the feeler arm, may actuate at least one control element which may comprise an electric switch which is arranged to switch the driving means of the machine on and off. However, this control element alternatively may be the actuating element of a clutch within the driving means of the saw bow for starting and stopping the operation of the latter. The control element may, in addition, serve for energizing a brake for abruptly absorbing the inertia of the movable parts of the driving means of the saw bow, for thus stopping the latter immediately.

In order to facilitate the operation of tightening the saw blade to its proper tension, it is another feature of the invention to provide the saw bow with a graduated scale on which there will be indicated the particular position and the movements of the feeler arm which, in turn, indicate the actual tension as well as the change of tension of the saw blade.

An object of the present invention is to provide a novel method and novel means for insuring that, when the tension of the saw blade is adjusted, the tension will be exactly as required.

Another object of the invention is to provide such a method and apparatus in which the driving means of the saw bow will be stopped immediately if the saw blade breaks or if, for some reason, its tension is not as required.

A further object of the invention is to eliminate completely, the disadvantages of known tightening and indicating devices.

Another object of the invention is to provide a device of a very simple nature and which requires no servicing to keep it at all times in proper operation.

A further object of the invention is to provide such a device which is not subject to wear and which is not endangered by being damaged by the rough treatment to which power hacksaws often are subjected.

For an understanding of the principles of the invention, reference is made to the following description of typical embodiments thereof as illustrated in the accompanying drawings.

DESCRIPTION OF THE PREFERRED EMBODIMENTS

Figure 1:
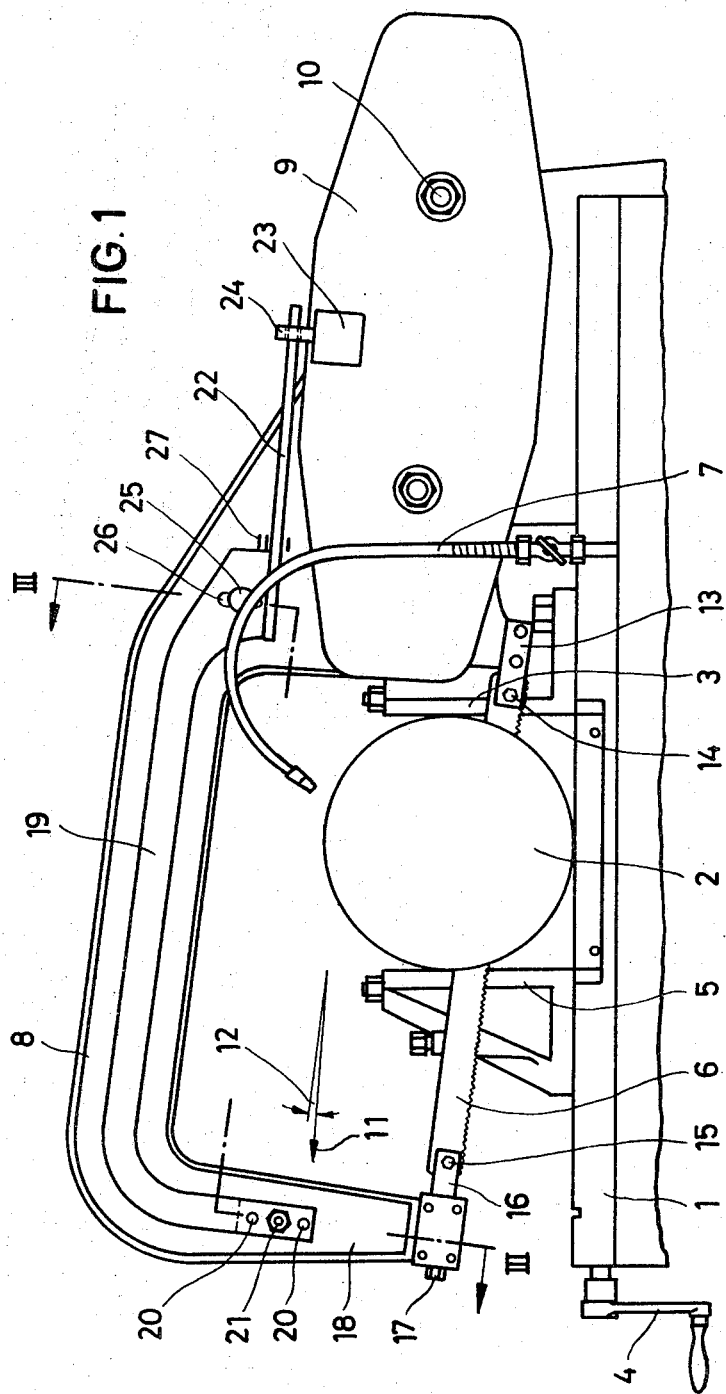
FIG. 1 is a side elevational view of a power hacksaw embodying the invention and having a saw bow which has an I-shaped cross section.
Figure 2:
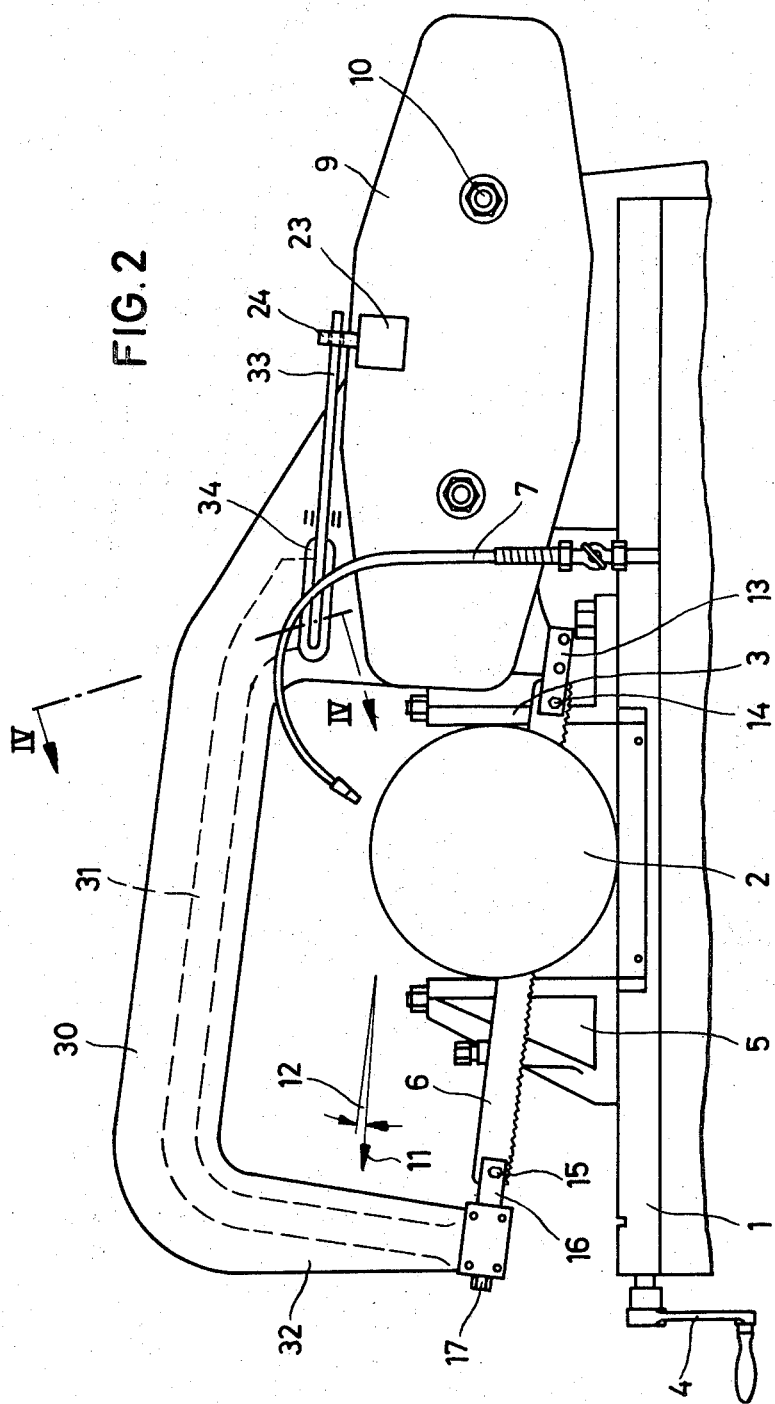
FIG. 2 is a side elevational view of a power hacksaw, embodying the invention, and provided with a hollow or tubular saw bow.

In the drawings, in which corresponding parts are designated by the same reference numerals, each of FIGS. 1 and 2 illustrates the upper part of a power hacksaw which comprises a bed 1 for supporting a workpiece 2 which is to be clamped between a stationary clamping jaw 3 and a second clamping jaw 5 which is adjustable by means of a crank handle 4. The workpiece 2 is shown as being partly cut through by a reciprocating saw blade 6 to which a cooling and lubricating fluid may be supplied through a flexible tube 7.

The saw blade 6 of the machine illustrated in FIG. 1 is clamped to a saw bow 8 of an I-shaped cross section and which may be reciprocating by suitable gearing, not shown. The rear end of saw bow 8 is slidable in guide means which are mounted in the housing part 9 of the machine.

These guide means of saw bow 8, together with the housing part 9, are pivoted up and down periodically about an axis 10 by a hydraulic mechanism of a known type, also not shown, which is designed to lift the saw blade 6 through a certain distance off the workpiece 2, during the idle return stroke of saw bow 8, and then again to apply the front end of blade 6 upon the workpiece at the beginning of the forward cutting stroke. Since saw blade 6 is inclined at an angle 12 to the direction of movement 11 of saw bow 8, saw blade 6 automatically will advance more deeply into the workpiece at each cutting stroke and thereby produce a cutting pressure whose magnitude is adjustable by a throttle valve on the hydraulic mechanism which effects the pivoting movement of the guide means of the saw bow.

On the rear end of saw bow 8, saw blade 6 is secured to a connecting member 13 by a pin or screw 14, while, on the front end of saw bow 8, saw blade 6 is hooked on a screw 15 which is inserted into a tightening member 16 which is axially slidable within the front end of saw bow 8 and adjustable by a nut or screw 17 to provide saw blade 6 with the proper tension as required for the cutting operation. When saw blade 6 is tightened, saw bow 8 will be slightly deformed elastically, whereby the front arm 18 of the saw bow will be bent in the direction toward the workpiece.

Figure 3:
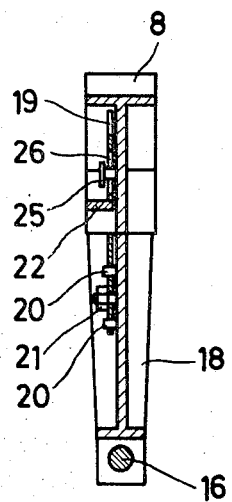
FIG. 3 is a cross-sectional view taken along the line III—III of FIG. 1.

Saw bow 8 is further provided with a feeler arm 19 which, as illustrated in FIGS. 1 and 3, is rigidly secured, by set pins 20 and a screw and nut 21, to a finished surface of the central web of front arm 18 of saw bow 8. Feeler arm 19 has a contour corresponding to that of saw bow 8, and extends freely along the latter in the direction toward the guide means of the saw bow. The rear end of feeler arm 19 is secured to, or integral with, a control bar 22 which, when saw blade 6 is properly tightened, extends parallel to the direction of movement 11 of saw bow 8 and thus also parallel to the guide means of the saw bow.

For controlling the driving means of the saw bow, an electric switch 23 is mounted on housing part 9. The actuating member 24 of this switch is bifurcated, and has an open side, at the end of its arms, extending from the plane of the drawing toward the rear thereof, so that these arms embrace control bar 22 and are spaced a few millimeters from this bar when saw blade 6 is adjusted to the proper tension.

By means of control bar 22, feeler arm 19 therefore may shift actuating member 24 upwardly or downwardly depending upon whether the tension of the saw blade is too high or too low or even nonexistent when the saw blade breaks, since the elastic deformation of arm 18 of the saw bow, which corresponds to the tension of the saw blade, will be transmitted to feeler arm 19 through the solid connection between these two parts.

Due to the length of feeler arm 19, even very small pivoting movements of arm 18 of the saw bow will result in considerable pivoting movements of control bar 22 at the point of its engagement with actuating member 24 of limit switch 23. Since this switch may be designed so as to respond to small deviations of actuating member 24 from its normal position, and then to stop the operation of the driving means of the saw bow, the invention insures that the machine will operate only when saw blade 6 has approximately the proper tension which is required for its normal operation. Therefore, especially when saw blade 6 breaks, the driving means of the saw bow will be stopped immediately since, at this moment, the entire tension of saw bow 8 will be released and cause a corresponding large pivoting movement of arm 18 of the saw bow and thus also of control bar 22. Consequently, as soon as a breakage of saw blade 6 occurs, saw bow 8 will be absolutely prevented from being driven further.

Since, as illustrated particularly in FIG. 3, feeler arm 19 is located within the confines of saw bow 8, it is protected by the latter, and thus there will be no danger that feeler arm 19 might be bent even with rough treatment of the machine. It is, however, still advisable to provide the feeler arm with suitable guide means at least at one point of its length, so as to insure that it will not be bent laterally. This may be attained by a guide screw 25 which is screwed into saw bow 8 and extends through an elongated hole 26 in feeler arm 19, and the head of which overlaps the sidewalls of this elongated hole.

In order to facilitate proper mounting of a new or different saw blade 6 in saw bow 8 and the adjustment of the saw blade to its proper tension, the relatively large pivoting movement of the rear part of feeler arm 19, relative to saw bow 8, may be utilized. It is for this purpose advisable to provide the rear part of the saw bow with a graduated scale 27 on which control bar 22 indicates the particular point to which feeler arm 19 is pivoted by the tension adjustment of the saw blade.

Figure 4:
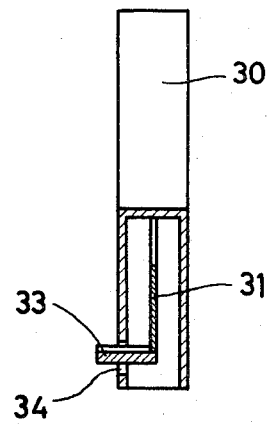
FIG. 4 is a cross-sectional view taken along the line IV-IV of FIG. 2.

FIGS. 2 and 4 illustrate the upper parts of a power hacksaw and a cross section of the saw bow which differ from the machine as illustrated in FIGS. 1 and 3 essentially only by the different cross-sectional shape of its bow 30, which is made of a hollow structure. This permits feeler arm 31, together with the saw bow 30, to be made by compound casting. This may be done by casting feeler arm 31 so that its lower front end, which is located within arm 32, of the saw bow, is cast integrally with the latter, while its remainder extends separately from saw bow 30 along the inside of the latter so as to be freely movable therein. The control bar 33 which is secured to or integral with the rear end of feeler 31 therefrom must project outwardly through an aperture 34 in one sidewall of the rear end of the saw bow. The end walls of aperture 34 also may serve for guiding feeler arm 31 and control bar 33.

The device according to the invention, as above described, for indicating the tension of the saw bow at any time, operates very reliably and is also very insensitive to the stresses and the rough treatment to which power hacksaws normally are subjected. In particular, since feeler arm 19 or 31 is not influenced except by the actually existing tension of saw blade 6, the operation of the new device also is fully reliable regardless of whether tightening member 16 is freely movable within its guide on the end of arm 18 or 32 of the saw bow or whether, because of improper treatment, tightening member 16 has a tendency to jam within its guide.

Insofar as the control element 23, 24 is concerned, it is obvious that it also may form an actuating element of an amplifier, for example, for operating a mechanical, hydraulic, or electromagnetic clutch or a brake motor. The control element 23, 24, as well as control bar 22 or 23 also may be covered by housing parts so as to be inaccessible from the outside and thus to be protected from damage by improper interference.

Figure 5:
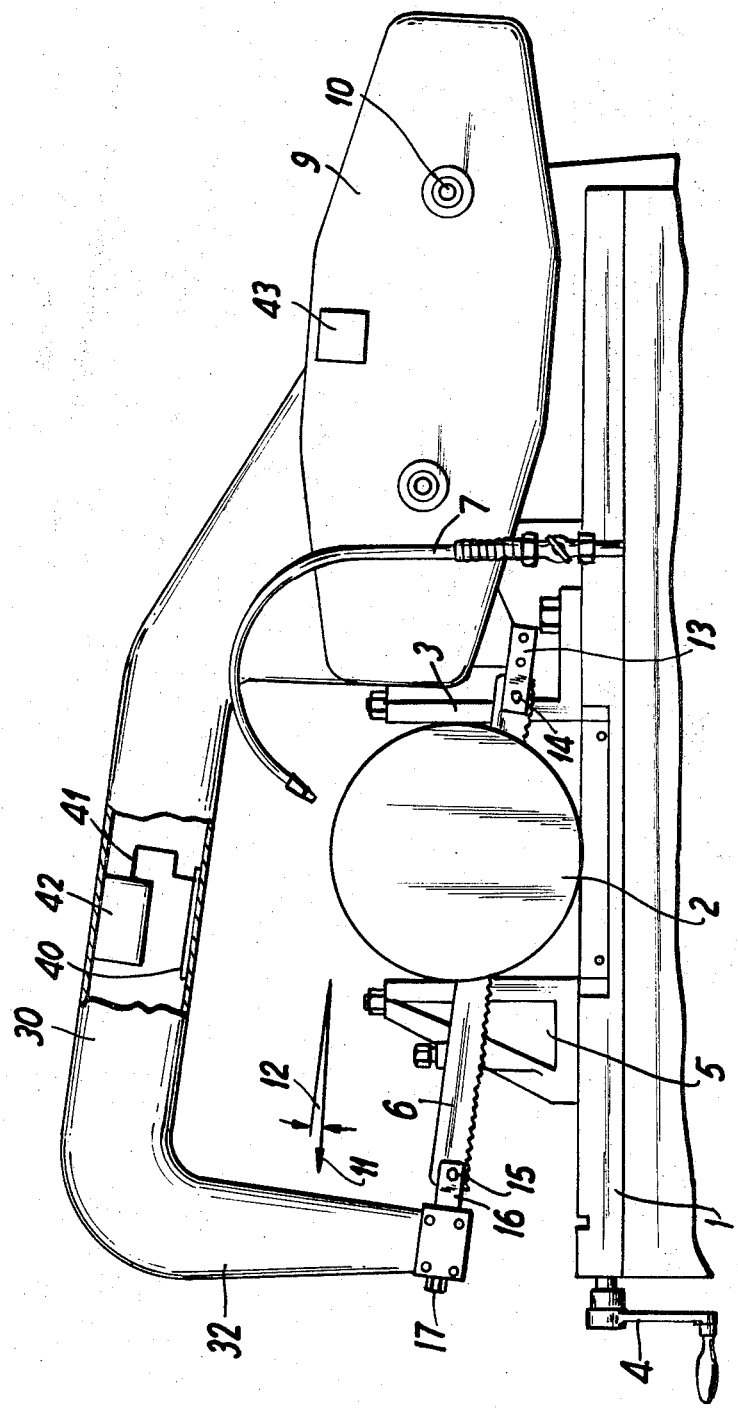
FIG. 5 is a side elevational view of a power hacksaw having a hollow or tubular saw bow in which there is mounted a strain bridge.

FIG. 5 illustrates a modification of the invention, corresponding essentially to that shown in FIG. 2, but in which electrical means are used to determine overtension or undertension of the saw bow. Referring to FIG. 5, a saw bow 30 is designed as a hollow body, in the same manner as in FIG. 2. A resistance-type strain bridge 40 is secured within saw bow 30, as by being cemented to extend along an inner surface thereof. The strain bridge 40 is connected by a conductor 41 with a transmitter 42. If, for example due to a fracture of saw blade 6, the electrical resistance of stain bridge 40 changes, transmitter 42 provides a signal to a receiver 43 which controls the power to the driving motor, and will interrupt this power upon breakage of the saw blade.

While specific embodiments of the invention have been shown and described in detail to illustrate the application of the principles of the invention, it will be understood that the invention may be embodied otherwise without departing from the principles.

I claim:

1. A method of determining and controlling the tension of a saw blade, mounted in a saw bow of a power hacksaw and having an end secured to a front arm of the saw bow, the power hacksaw having guide means for the saw bow and having at least one control element controlling reciprocation of the saw bow and mounted in fixed relation relative to the guide means, said method comprising the steps of measuring the tension of the saw bow during reciprocation thereof; and transmitting the measured value of the bow tension to at least one control element to operate the latter to interrupt reciprocation of the saw bow when the measured value indicates that the tension of the saw blade deviates substantially from a preselected tension thereof.

2. A method, as claimed in claim 1, comprising the steps of effecting electric strain bridge resistance measurements of the saw bow near the center thereof to provide an electric output signal when the measured resistance value deviates substantially from a resistance value corresponding substantially to the preselected tension of the saw blade; and transmitting said output signal to at least one control element to operate the latter to interrupt reciprocation of the saw bow.

3. A method, as claimed in claim 1, including the steps of connecting one end of a feeler element fixedly to the front arm of the saw bow and operatively associating a free end of the feeler element with at least one control element; using said feeler arm to continuously mechanically measure the angular position of the front arm of the saw bow relative to the guide means of the saw bow; and, responsive to a predetermined angular position of the front arm of the saw bow relative to the guide means of the saw bow, corresponding to a deviation of the tension of the saw blade from the preselected tension, operating at least one control element by the free end of the feeler element to interrupt reciprocation of the saw bow.

4. In a power hacksaw having a saw bow, driving means reciprocating said saw bow, a housing part, guide means in said housing part guiding said saw bow, means connecting the ends of a saw blade to the front and rear arms of said saw bow, and means on the end of said front arm for tightening said saw blade between said arms, the improvement comprising, in combination means measuring the tension of said saw blade by determining the bending effects of said tension upon said saw bow; and control means for said driving means acted upon by said measuring means to stop the movements of said saw bow by said driving means when said tension deviates from a preselected operating tension.

5. A power hacksaw, as claimed in claim 4, in which said measuring means comprises a strain bridge connected to said saw bow near the center of its length to determine the normal electric resistance value of said saw bow occurring when said saw blade has said preselected tension, and determine a change from said normal resistance value occurring when the tension of said saw blade deviates substantially from said preselected tension; said control means comprising at least one control element mounted on said housing part; and an electric transmitter movable with said saw bow and connected to said stain bridge and said control element and, when said change occurs, transmitting an electric signal to said control element to actuate said control element to stop movement of said saw bow by said driving means.

6. A power hacksaw, as claimed in claim 4, in which said measuring means comprises a substantially saw bow-shaped feeler arm having a front end rigidly secured to said front arm of said saw bow near said tightening means, the remainder of said feeler arm extending freely along said saw bow to a point near the rear end of said saw bow and being pivotable by said front arm, substantially without engaging with said saw bow, in a plane substantially parallel to the plane of said saw bow; a control bar rigidly secured to the rear end of said feeler arm and extending in the direction of movement of the saw bow, and being substantially parallel to said guide means when said saw blade is tightened to said preselected tension and said front arm extends at a normal angle to the central part of said saw bow; said control means comprising at least one control element; said control bar acting upon said control element to stop movement of said saw bow by said driving means when the tension of said saw blade deviates substantially from said preselected tension so that said front arm extends at an angle different from said normal angle and said feeler arm accordingly is pivoted relative to the central and rear parts of said saw bow.

7. A power hacksaw, as claimed in claim 6, in which said saw bow has a cross-sectional shape such that said feeler arm is disposed within the outer lateral contours of said saw bow so as to be protected from damage by said saw bow with and only the front end of said feeler arm is secured to said front arm while the remainder of said feeler arm is capable of being pivoted within said plane and substantially without engaging with said saw bow when said front arm is bent by a change of tension of said saw blade.

8. A power hacksaw, as claimed in claim 7, in which said saw bow has a tubular cross section and is formed integral with said feeler arm by compound casting in a manner such that the front end of said feeler arm is integral with said front arm of said saw bow, and said front end and the main length of said feeler arm are fully enclosed by said saw bow the rear end of said saw bow having an aperture through which only the extension of said bow, in the form of said control bar, projects outwardly of said saw bow.

9. A power hacksaw, as claimed in claim 6, comprising means on said saw bow guiding the free part of said feeler arm at least at one point without interfering with pivoting movements of said feeler arm in said plane and relative to said saw bow.

10. A power hacksaw, as claimed in claim 4, in which said control means comprises at least one electric switch controlling said driving means.

11. A power hacksaw, as claimed in claim 4, in which said driving means includes a clutch; said control means comprising a member operating said clutch.

12. A power hacksaw, as claimed in claim 10, comprising a brake motor connected to said switch and operable to stop movement of said saw bow immediately upon operation of said switch to stop movement of said saw bow by said driving means.

13. A power hacksaw, as claimed in claim 6, comprising a graduated scale near the rear end of said saw bow; said control bar on the rear end of said feeler arm being cooperable with said scale to indicate on said scale, at any time, the tension of said saw blade.

14. A power hacksaw, as claimed in claim 7, in which said saw bow has a beam cross section including a pair of flanges interconnected by a web; said feeler arm extending along said web within the lateral limits of said flanges.